(12) United States Patent
Cipollini

(10) Patent No.: US 7,632,338 B2
(45) Date of Patent: Dec. 15, 2009

(54) ELECTROCHEMICAL OXYGEN PUMP FOR FUEL STABILIZATION UNIT

(75) Inventor: Ned E. Cipollini, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 568 days.

(21) Appl. No.: 11/543,535

(22) Filed: Oct. 5, 2006

(65) Prior Publication Data

US 2008/0083608 A1   Apr. 10, 2008

(51) Int. Cl.
  *B01D 53/22* (2006.01)
(52) U.S. Cl. .......................... 95/46; 95/54; 96/6; 96/8; 96/10; 210/640; 204/157.5; 204/266; 204/271
(58) Field of Classification Search .......... 96/4, 96/6, 7, 8, 10, 12; 95/45, 46, 54; 210/640; 204/157.5, 266, 271
See application file for complete search history.

(56) References Cited

U.S. PATENT DOCUMENTS

| | | | | |
|---|---|---|---|---|
| 4,609,383 | A | * | 9/1986 | Bonaventura et al. .......... 95/46 |
| 5,108,465 | A | * | 4/1992 | Bauer et al. ..................... 95/54 |
| 5,122,239 | A | * | 6/1992 | McElroy et al. ............. 205/633 |
| 6,171,368 | B1 | * | 1/2001 | Maget et al. .................... 95/54 |
| 6,315,815 | B1 | | 11/2001 | Spadaccini et al. |
| 6,709,492 | B1 | * | 3/2004 | Spadaccini et al. ............... 96/6 |
| 2005/0211568 | A1 | * | 9/2005 | Cipollini ..................... 205/687 |

* cited by examiner

*Primary Examiner*—Jason M Greene
(74) *Attorney, Agent, or Firm*—Carlson, Gaskey & Olds

(57) ABSTRACT

A fuel stabilization unit includes an electrochemical device for promoting the formation of water utilizing oxygen from a fuel stream for generating an oxygen partial pressure differential across an oxygen permeable membrane.

12 Claims, 2 Drawing Sheets

ELECTROCHEMICAL OXYGEN PUMP FOR FUEL STABILIZATION UNIT

BACKGROUND OF THE INVENTION

This invention generally relates to fuel deoxygenation system for removing oxygen from a fuel stream. More particularly, this invention relates to an electrochemical device for generating a partial oxygen pressure differential for removing oxygen from the fuel stream.

It is common practice to use fuel as a cooling medium for various systems onboard an aircraft. The usable cooling capacity of a particular fuel is limited by the formation of coke, which in turn is dependent on the amount of dissolved oxygen present within the fuel. It has been determined that decreasing the amount of dissolved oxygen present within the fuel reduces the formation of insoluble products referred to as "coke" or "coking". Further, the removal of dissolved oxygen from the fuel increases the temperature at which fuel can be heated without generating the autooxidative reactions that cause "coking".

U.S. Pat. Nos. 6,315,815 and 6,709,492 assigned to Applicant, disclose devices for removing dissolved oxygen using a gas-permeable membrane disposed within the fuel system. As fuel passes along the permeable membrane, oxygen molecules in the fuel dissolve into the membrane and then diffuse across it and are removed. A vacuum or oxygen partial pressure differential across the permeable membrane drives oxygen from the fuel, which is unaffected and passes over the membrane.

The creation of a vacuum proximate the permeable membrane requires a vacuum pump or other device. Generating a vacuum to produce the required oxygen partial-pressure differential across the permeable membrane can result in a total pressure differential that requires a rather bulky support structure for the permeable membrane. Further, the vacuum pump itself is bulky and requires a substantial amount of energy that is provided by an energy conversion device. A strip gas, such as nitrogen can be utilized for generating the desired oxygen partial pressure differential. However, the use of a strip gas requires a stored supply of a non-oxygen containing gas. As appreciated, the vacuum pump, increased support structure and stored strip gas all add weight and complexity to a fuel delivery system.

Accordingly, it is desirable to design and develop a system and device with reduced weight, structure and complexity for removing oxygen from a jet fuel stream.

SUMMARY OF THE INVENTION

An example fuel stabilization unit includes an oxygen permeable membrane through which oxygen from the fuel is drawn responsive to an oxygen partial pressure differential created by consuming molecular oxygen by electrochemical combination with hydrogen ions to form water with an electrochemical oxygen pump device.

The example fuel stabilization unit includes a permeable membrane that is supported on a porous structure. Fuel is flowed across a fuel side of a permeable membrane and an oxygen partial pressure differential is generated across a permeable membrane by converting oxygen on a non fuel side of the permeable membrane to water.

An electrochemical device on a non-fuel side of the permeable membrane provides for the combination of dissolved oxygen with hydrogen ions and electrons to form water. The formation of water depletes oxygen within the gas on the non-fuel side of the permeable membrane, thereby generating the desired partial oxygen pressure differential.

The electrochemical device includes first and second electrodes and an electrolyte disposed therebetween. Oxygen on the non-fuel side of the permeable membrane is combined with hydrogen ions and electrons to form water on the first electrode. The hydrogen ions and electrons are generated through a water electrolysis reaction occurring on the second electrode. The electrolysis reaction consumes water and forms oxygen on the second electrode which is then vented and cleared from the electrochemical device.

Accordingly the example fuel separation unit according to this invention utilizes an electrochemical device for generating the desired oxygen partial pressure differential without excessive additional structure or devices.

These and other features of the present invention can be best understood from the following specification and drawings, the following of which is a brief description.

DETAILED DESCRIPTION OF THE PREFERRED EMBODIMENT

Figure 1:
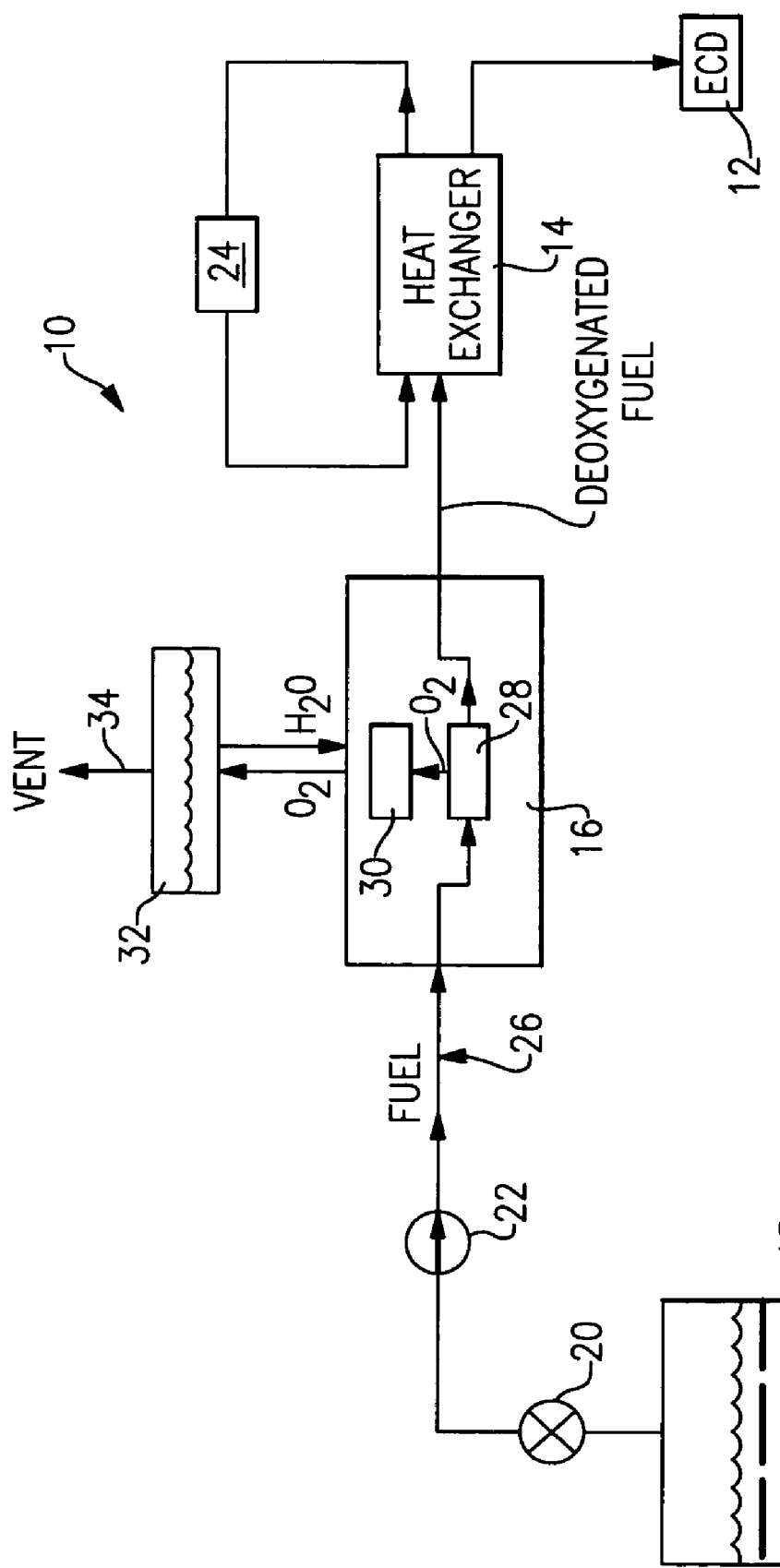
FIG. 1 is a schematic representation of a fuel system supplying fuel to an energy conversion device.

Referring to FIG. 1, an example fuel delivery system 10 is shown and includes a fuel stabilization unit 16. The fuel stabilization unit 16 removes dissolved oxygen from fuel that is supplied to an energy conversion device (ECD) 12. The ECD 12 can be any device that releases energy from the fuel. The ECD 12 can consist of any conversion device known to a worker skilled in the art. One such energy conversion device is a gas turbine engine that includes a compressor that compresses incoming air and combines that compressed incoming air within a combustor to create an air fuel mixture. The air fuel mixture is then ignited and the exhaust gasses are passed through a turbine that in turn powers the combustor.

In the example ECD 12, the fuel serves as a coolant for a subsystem 24. A heat exchanger 14 transfers heat generated in the subsystem 24 to the fuel. The heat exchanger 14 may be utilized to provide cooling for devices that correspond and operate with the ECD 12. Further the heat exchanger 14 may also be utilized to provide cooling functions for other systems not specifically related to the ECD 12. In any of the above cases, the deoxygenation of the fuel increases the capacity for the fuel absorb heat from other systems thereby providing a desired increase in performance.

The fuel delivery system 10 includes a fuel reservoir 18 that contains the supply of fuel for the ECD 12. While stored, the fuel will absorb a large amount of oxygen. The amount of oxygen can be somewhere within the range of approximately 70 parts per million (ppm). Fuel within the reservoir 18 is pumped through a pump 20 and regulated by a valve 22 through a fuel conduit 26 to the fuel stabilization unit 16.

The fuel stabilization unit 16 includes an oxygen permeable membrane 28 and an electrochemical device 30. The electrochemical device 30 promotes reaction of between oxygen, hydrogen ions and electrons to form water. The formation of water removes dissolved oxygen from the non-fuel side 27 (FIG. 2) of the permeable membrane 28, thereby generating the desired oxygen partial pressure differential that draws dissolved oxygen from the fuel. Dissolved oxygen on a non-fuel side of the permeable membrane 28 is combined with hydrogen to form water. The water is then either consumed by the electrochemical device or routed to a reservoir 32 where it can be stored and used for other systems or vented overboard as shown at 34. Oxygen generated in the electrochemical device is vented overboard as shown at 34.

Figure 2:
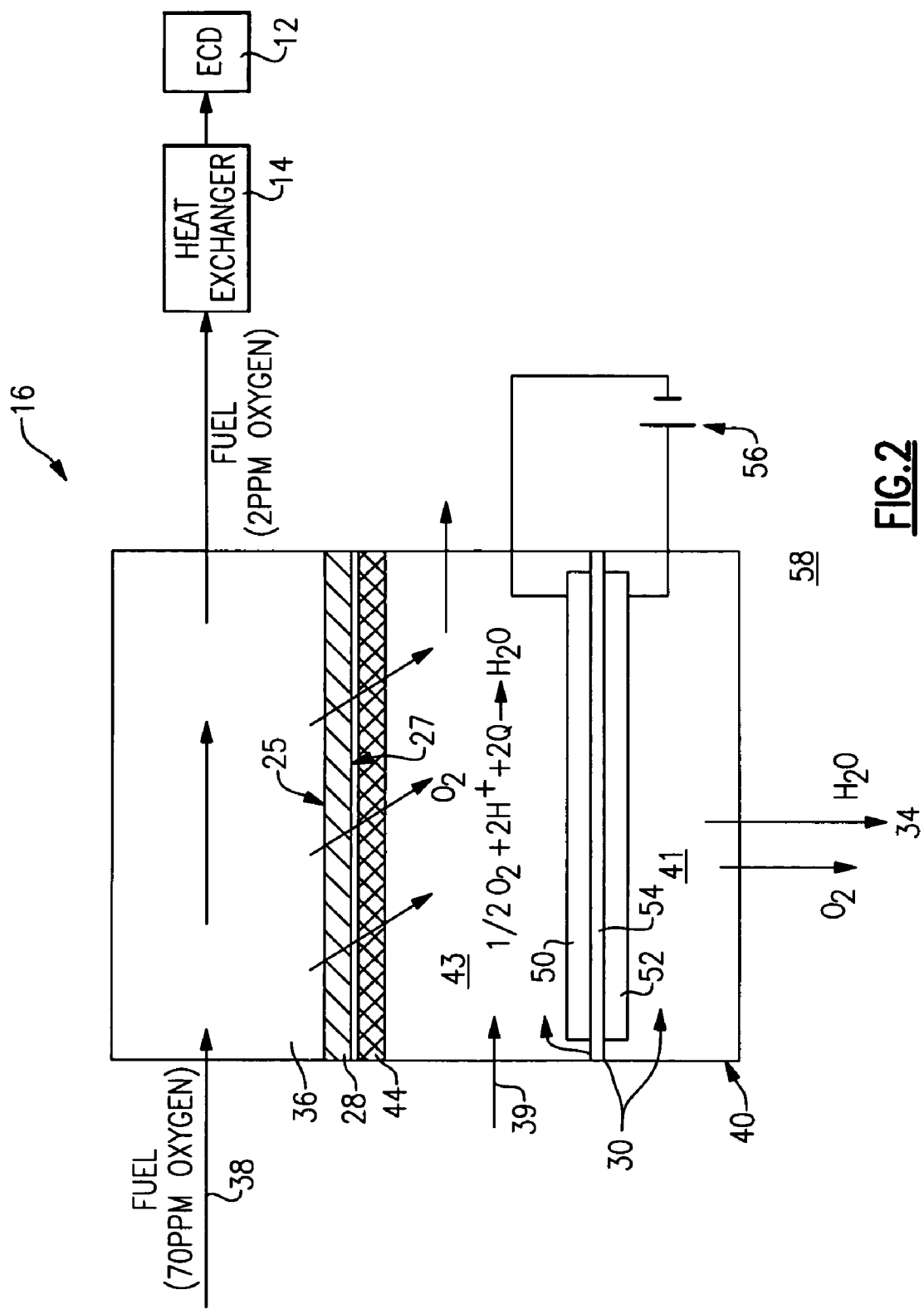
FIG. 2 is a schematic representation of an example fuel stabilization unit including the electrochemical device according to this invention.

Referring to FIG. 2, the fuel stabilization unit 16 receives fuel 38 through conduit 26 from the fuel reservoir 18. This fuel will typically include approximately 70 ppm of dissolved oxygen. A fuel stream 38 flows against a fuel side of a permeable membrane 28. The permeable membrane 28 is supported by a porous support structure 44. The total pressure differential between the fuel-side 25 of the permeable membrane 28 and the non-fuel 27 side determine the strength, thickness and configuration of the support structure 44. The greater the total pressure differential across the permeable membrane 28, the larger and more robust the support structure 44.

In the example fuel stabilization unit 16, a chamber 40 is disposed on the non-fuel 27 side of the permeable membrane 28. The electrochemical device 30 and more specifically, the electrolyte of the electrochemical device 54, separates the chamber 40 into two chambers, 41 and 43. The chamber 40 is filled with a gas 39 such as Nitrogen that contains little oxygen. The electrochemical device 30 maintains a low oxygen partial pressure by application of a potential supplied by the power supply 56. The gas within the chamber 42 may be circulated to improve transfer of oxygen from the membrane 28 to the first electrode 50. The chamber 43 may also be made thin to bring the membrane and the first electrode into close proximity. The water generated in the first electrode may be absorbed by the electrolyte 54 or remain in the fuel where it is inert. The electrochemical reaction on the second electrode 52 consumes water and produces oxygen. The gas 39 within the chamber 41 may be circulated to obtain water and vent oxygen. The chamber 43 includes an overall pressure substantially equal to the pressure exerted against the permeable membrane 28 on the fuel side. This substantial equalization of pressure across the permeable membrane 28 provides for the use of a thinner, lighter support structure 44.

Although the overall pressure differential across the permeable membrane 28 is substantially equal, a partial oxygen pressure differential is still produced to provide the driving force for removal of dissolved oxygen from the fuel stream 38. The oxygen partial pressure differential is provided by converting oxygen within the chamber 43 to water. Once oxygen within the chamber 43 is converted to water, that water is either absorbed by the electrolyte 54 or used as a reactant on the second electrode, or remains in the fuel stream where it is inert and causes no harm to the operation of the heat exchanger 14 or ECD 12.

The elimination of oxygen from within the chamber 43 generates the desired oxygen partial pressure differential across the permeable membrane 28 that is required for drawing dissolved oxygen from the fuel stream 38. Accordingly, fuel exiting the fuel stabilization unit 16 will include approximately 2 ppm of oxygen. This reduced level of oxygen within the fuel increases the usable heat absorption capacity of the fuel stream.

The electrochemical device 30 includes a first electrode 50 and a second electrode 52 that are powered by a battery 56. Disposed between the first electrode 50 and the second electrode 52 is an electrolyte 54. The electrolyte 54 comprises a perflourinated polymer that provides the desired ionic transfer for promoting reaction between dissolved oxygen, hydrogen ions and electrons. On example configuration utilizes a perflourinated polymer known as Nafion in membrane form that is approximately 175 microns thick. As appreciated other materials that provide the desired insulation and ionic transfer properties are also within the contemplation of this invention.

The first electrode 50 is a cathode and is attached to a negative terminal of the battery 56. The second electrode 52 is an anode and is connected to a positive terminal of the battery 56. The electrodes 50 and 52 are separated from the fuel flow 38 by the oxygen permeable membrane 28 and therefore are less susceptible to undesirable clogging that may occur when the electrode 50 is disposed adjacent the fuel stream 38. The distance between the oxygen permeable membrane 28 and the first electrode 50 may be made as small as possible to improve transfer of oxygen through the chamber 42.

The electrodes 50, 52 and electrolyte 54 are laminated together to form a mechanical bond that allows ions to transport through the three components of the electrochemical device 30.

The electrochemical device 30 promotes the reaction of oxygen with hydrogen ions and electrons within the chamber 43 according to the chemical formula:

$$\tfrac{1}{2} O_2 \text{ (fuel)} + 2H^+ + 2e^- = H_2O \qquad \text{Equation 1.}$$

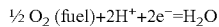

The water generated by the combination of oxygen with hydrogen is disposed within the chamber 43 and effectively removes oxygen from the non-fuel side of the permeable membrane 28 to create the desired partial oxygen pressure differential.

Operation of the fuel stabilization unit 16 is continual such that as the fuel stream flows adjacent the fuel side of the permeable membrane 28, dissolved oxygen flows through the permeable membrane 28 and into the chamber 40. The electrochemical device 30 continually combines dissolved oxygen with hydrogen ions and electrons on the first electrode 50 to create the oxygen partial pressure differential that draws dissolved oxygen from the fuel stream 38 into chamber 43. The electrochemical device 30 continually converts water to oxygen, hydrogen ions and electrons on the second electrode 54 in chamber 41. The oxygen produced in chamber 41 is vented to the atmosphere and water required for the reaction is supplied from reservoir 32. In this way, the electrochemical device with power supplied by battery 56, serves as an electrochemical oxygen pump.

The example disclosed utilizes the electrolysis of water as the source of hydrogen ions and electrons. However, it is within the contemplation of this invention to utilize other processes. For example, other materials may be supplied by the reservoir 32 such as a methanol-water mixture: $CH_3OH + H_2O \rightarrow CO_2 + 6H^+ + 6e^-$ or other compound capable of electrochemical oxidation. In the example utilizing methanol, carbon dioxide is vented instead of oxygen.

The chamber 43 will include a gas such as nitrogen with little oxygen to begin with. Oxygen from the fuel stream 38 is continually combined with hydrogen ions and electrons in the presence of the electrochemical device 30 to form water. In other words, oxygen within the chamber 40 is converted to water at a rate that provides a desired oxygen partial pressure differential that will remove the desired amounts of oxygen from the fuel flow.

The electrochemical device 30 drives this combination of oxygen to hydrogen by way of a power source 56. The example electrochemical device 30 utilizes approximately 13 watts of power at one volt to remove dissolved oxygen from a flow of 250 gallons per hour of fuel. As appreciated, different rates of fuel flow require different amounts of power dependent on the desired oxygen removal rate.

Accordingly, this fuel stabilization unit 16 provides for the efficient and simple removal of oxygen from a fuel stream without the need of additional complex systems or storage of a strip gas.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel stabilization unit for removing oxygen from a fuel stream comprising:
   an oxygen permeable membrane including a fuel side in contact with a fuel stream containing oxygen and a non-fuel side;
   a chamber through which an oxygen depleted gas flows adjacent the non-fuel side of the oxygen permeable membrane; and
   an electrochemical device disposed within the chamber and including a first electrode adjacent the non-fuel side of the oxygen permeable membrane and a second electrode on a side of the electrochemical device opposite the permeable membrane, the electrochemical device generates an oxygen partial pressure differential across the permeable membrane for diffusing oxygen from the fuel stream by promoting the formation of water adjacent the non-fuel side of the permeable membrane using oxygen from the fuel stream drawn through the oxygen permeable membrane.

2. The fuel stabilization unit as recited in claim 1, wherein the electrochemical device promotes the combination of oxygen with hydrogen ions and electrons to form water to generate the desired oxygen partial pressure differential.

3. The fuel stabilization unit as recited in claim 1, wherein the electrochemical device comprises the first electrode, the second electrode and an electrolyte disposed between the first and second electrodes.

4. The fuel stabilization unit as recited in claim 1, including a power source powering the electrochemical device.

5. The fuel stabilization unit as recited in claim 1, wherein the oxygen depleted gas comprises an inert gas.

6. The fuel stabilization unit as recited in claim 1, wherein the oxygen depleted gas comprises a gas inert when exposed to a voltage between 0 and 2 volts.

7. The fuel stabilization unit as recited in claim 1, wherein the oxygen depleted gas comprises nitrogen.

8. A method of deoxygenating a fuel stream comprising the steps of:
   a) flowing a fuel stream on a fuel side of an oxygen permeable membrane;
   b) flowing an oxygen depleted gas through a chamber adjacent a non-fuel side of the oxygen permeable membrane opposite from the fuel side; and
   c) generating an oxygen partial pressure differential across the permeable membrane by using an electrochemical device having a first electrode adjacent the non-fuel side of the permeable membrane for promoting a reaction between oxygen drawn through the permeable membrane, hydrogen ions and electrons to form water on the non-fuel side of the permeable membrane.

9. The method as recited in claim 8, wherein the electrochemical device comprises a first electrode, a second electrode and an electrolyte disposed between the first and second electrode.

10. The method as recited in claim 9, wherein the electrolyte separates the chamber on the side opposite the fuel side into a first chamber adjacent the permeable membrane and a second chamber spaced apart from the permeable membrane by the first chamber, and the method includes the step of electrochemically removing oxygen from the first chamber to the second chamber.

11. The method as recited in claim 10, including venting the formed oxygen away from the second chamber.

12. The method as recited in claim 8, including flowing nitrogen gas adjacent a side opposite the fuel-side of the permeable membrane.

* * * * *

UNITED STATES PATENT AND TRADEMARK OFFICE
CERTIFICATE OF CORRECTION

PATENT NO. : 7,632,338 B2 Page 1 of 1
APPLICATION NO. : 11/543535
DATED : December 15, 2009
INVENTOR(S) : Ned E. Cipollini It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 639 days.

Signed and Sealed this

Twenty-first Day of December, 2010

David J. Kappos
*Director of the United States Patent and Trademark Office*